United States Patent
Newberth, III et al.

(10) Patent No.: US 6,872,454 B2
(45) Date of Patent: Mar. 29, 2005

(54) IMPREGNATION SEALANTS UTILIZING HYDROSILATION CHEMISTRY

(75) Inventors: Frederick F. Newberth, III, West Hartford, CT (US); Peter J. Chupas, Stony Brook, NY (US)

(73) Assignee: Henkel Corporation, Rocky Hill, CT (US)

( * ) Notice: Subject to any disclaimer, the term of this patent is extended or adjusted under 35 U.S.C. 154(b) by 42 days.

(21) Appl. No.: 10/276,418

(22) PCT Filed: May 18, 2001

(86) PCT No.: PCT/US01/16067

§ 371 (c)(1),
(2), (4) Date: Nov. 15, 2002

(87) PCT Pub. No.: WO01/90248

PCT Pub. Date: Nov. 29, 2001

(65) Prior Publication Data

US 2004/0126593 A1 Jul. 1, 2004

Related U.S. Application Data

(60) Provisional application No. 60/205,954, filed on May 19, 2000.

(51) Int. Cl.$^7$ ................................................ B32B 25/20
(52) U.S. Cl. ........................ 428/446; 528/32; 528/14; 528/19; 528/15; 528/37; 528/31; 528/39; 528/25; 427/387
(58) Field of Search .......................... 528/31, 32, 14, 528/19, 15, 37, 39, 25; 427/387; 428/446

(56) References Cited

U.S. PATENT DOCUMENTS

| 3,672,942 | A |   | 6/1972  | Neumann et al. ........... 117/62.2 |
| 4,416,921 | A |   | 11/1983 | Dunn ......................... 427/353 |
| 4,707,531 | A | * | 11/1987 | Shirahata |
| 5,583,178 | A |   | 12/1996 | Oxman et al. ............... 524/862 |
| 5,618,857 | A |   | 4/1997  | Newberth, III et al. ..... 523/176 |
| 5,837,774 | A |   | 11/1998 | Tarumi et al. ............... 525/104 |

FOREIGN PATENT DOCUMENTS

| EP | 0 850 996 A2 |   | 7/1998  | ........... C08L/83/04 |
| EP | 0 999 236 A1 |   | 5/2000  | ........... C08L/83/05 |
| EP | 1 075 034 A1 |   | 2/2001  | ........... H01M/8/02 |
| JP | 06 279691    |   | 2/1995  |                       |
| WO | 99 53559     |   | 10/1999 | ........... H01M/8/02 |
| WO | 00/25323     | * | 5/2000  |                       |

* cited by examiner

Primary Examiner—Kuo-Liang Peng
(74) Attorney, Agent, or Firm—Steven C. Bauman

(57) ABSTRACT

This invention relates generally to heat curable compositions, particularly well utilized for use as impregnation sealants curable using hydrosilation chemistry. The heat curable compositions of the present invention can be stored and shipped as a one-part composition. The composition includes at least one curable unsaturated organic component, at least one co-reactant, which has at least two functional groups reactive with the organic component, and at least one catalyst of initiating the cure of the composition.

20 Claims, No Drawings

IMPREGNATION SEALANTS UTILIZING HYDROSILATION CHEMISTRY

This application claims benefit of 60/205,954 May 19, 2000.

FIELD OF THE INVENTION

This invention relates generally to heat curable compositions, particularly well suited for use as impregnation sealants, curable using hydrosilation chemistry.

BRIEF DESCRIPTION OF RELATED TECHNOLOGY

Impregnation sealing is commonly used to seal microporosity of a variety of articles, structural components, and assemblies, such as, die castings, electronic components, powder metal parts, fiber-reinforced resin composites and the like. Impregnating articles with sealants increases its density, improves its strength and reduces corrosion inside the micropores of the article. Upon curing, the impregnated articles are capable of withstanding liquid and gas pressures during use. Microporosity in porous articles is particularly acute in components formed from metal powder and presents a significant obstacle in commercial end use applications, particularly when such porous articles are employed in applications, such as fluid power systems and other liquid handling applications, as well as plating, coating and further processing.

Many porous articles are used commercially today, and manufactured from a wide variety of metals. Zinc, copper, iron, aluminum, brass and various other alloys are among the common metals to be sealed.

Conventional impregnation sealant compositions may be self-curing anaerobic sealants, thermal curing sealants and sealants which cure by both anaerobic and heat cure mechanisms. Illustrative (meth)acrylate based anaerobic impregnant sealant compositions are described in U.S. Pat. Nos. 5,618,857 issued to Newberth, III et al, and 3,672,942 issued to Neumann et al, which are incorporated herein by reference. Heat curable sealant compositions are described in U.S. Pat. No. 4,416,921 issued to Dunn.

Although known commercial (meth)acrylate-based, impregnation sealant compositions have many advantages to the end-users, the compositions have a finite shelf life, which may be reduced if stored and/or shipped under conditions of extreme heat. This becomes an issue due to the common practice of bulk storing and/or shipping the compositions in a ready-to-use, one-part form, in which the curable portion (monomers) and the cure initiating components are already mixed together.

There is a perception that exposure of one-part (meth) acrylate-based systems, as well as other free-radical initiated systems, to excessive heat during transport can result in premature polymerization in the transport tank. There is also a perception that such spurious polymerization could result in the generation of potentially dangerous amounts of heat. Though unlikely, such undesired spurious polymerization may be violent and could create potential environmental hazards. As a result, there is also a perception that one-part (meth)acrylate-based impregnation sealant systems may stray from compliance with certain U.S. Department of Transportation ("DOT") guidelines.

While the use of a two or multi-part composition, whereby the monomers and cure components are stored and/or shipped separately, alleviates premature polymerization, it is less desirable from a cost standpoint and end-user convenience standpoint, due to required additional training of and mixing by the end-user.

Accordingly, it would be desirable to provide an impregnation sealant composition that is shelf-stable at commonly encountered storage and/or shipping temperatures as a one-part composition, resisting premature polymerization, while still maintaining excellent viscosity and rapid cure characteristics.

SUMMARY OF THE INVENTION

The present invention provides such an impregnation sealant that can be stored and/or shipped as a one-part, heat curable composition that resists premature polymerization.

In one aspect of the invention, there is provided a heat curable composition which includes at least one curable unsaturated organic component, at least one co-reactant is provided-having at least two functional groups reactive with the organic component and at least one catalyst capable of initiating cure of the composition.

In another aspect of the invention, there is provided an article of manufacture having an openable container for packaging the flowable inventive composition and the inventive sealant composition stored therein In yet another aspect of the present invention, there is provided a method of manufacturing a heat curable composition of the present invention which includes providing at least one curable unsaturated organic component, combining the curable unsaturated organic component with at least one co-reactant having at least two functional groups reactive with the organic component, and at least one catalyst capable of initiating cure of the composition.

The present invention also provides an article of manufacture having a porous surface which is impregnated with the inventive heat curable composition, and such article may be constructed of a metal, plastic or wood substrate and combinations thereof. The article may be an electronic component.

DETAILED DESCRIPTION OF THE INVENTION

The present invention provides a one-part curable composition that overcomes the drawbacks of conventional sealant compositions. Specifically, the inventive sealant compositions are able to resist premature polymerization so as to obviate the need for it to be stored as a two-part system. In fact, the inventive composition is capable of being stored and shipped together as a one-part composition, i.e. its curable organic component may be in contact with its co-reactant in a single container. Thus, the compositions of the present invention avert the concerns with the DOT shipping guidelines typically associated with conventional sealant compositions. Additionally, the sealant composition can be stored in a single ready-to-use package that will not require mixing on the part of the consumer. The present invention provides these advantages while still retaining excellent sealant properties.

The composition of the present invention includes a curable unsaturated organic component, a co-reactant having at least two functional groups reactive with the organic component and at least one catalyst. Other components may also be added to the composition including but not limited to other co-monomer species, reactive diluents, pigments, surfactants, fillers, polarization inhibitors, stabilizers, anti-oxidants, anti-corrosion additives and combinations thereof.

The curable unsaturated organic component of the present invention serves as the primary component in the matrix of the composition This component is preferably a non-silicon based cross-linkable monomer and does not contain alcohol or ester groups. The organic component is reactive with the co-reactant during hydrosilation. The curable unsaturated organic component employed in the impregnant sealant composition of the invention may be of any suitable type, and resins including epoxies, phenolics, silicones, ally resins, vinyl resins sulfone resins, and combinations thereof. Particularly useful organic components are allyl and vinyl resins such as vinyl stearate, allyl methacrylate, vinyl methacrylate and combinations thereof.

Additional useful allyl resins include allyl acetate, allyl acetoacetate, allyl alcohol, allyl alcohol 1,2-butoxylate, allylamine, N-allylaniline, 4-allylanisole, allylbenzene, allyl 1-benzotrazolyl carbonate, ally benzyl ether, ally bromide, allyl-2-bromo-2-methylpropionate, allyl butyl ether, allyl butyrate, ally chloride, allyl chloroacetate, allyl chloroformate, allyl cyanide, ally cyanoacetate, allyl cyclohexanepropionate, 3-allylcyclohexanone, allylcyclohexylamine, allylcyclopentane, N-allylcyclopentylamine, allyl diethylphosphonoacetate, 4-allyl-1,2-dimethoxybenzene, 4-allyl -2,6-dimethoxyphenol, allyldiphenylphosphine, allyl disulfide, allyl ether, ally ethyl ether, allyl glycidyl ether, allyl 1,1,2,3,3,3-hexafluoropropyl ether, 1-ally-3-2-hydroxyethyl 2-thiourea, o-allylhydroxylamine hydrochloride hydrate, 1-allylimidazole, allyl iodide, allyl isocyanate, allyl isothiocyanate, allylmagnesium bromide, allylmagnesim chloride, allyl mercaptan, allyl methacrylate, allyl carbonate, 2-allyl-2-methyl-1,3-cyclopentanedione, 2-allyl-6-methylphenol, 3-allyl-5-[1-methyl-2(1H)pyridinylidene] rhodanine, ally methyl sulfide, 2-allyloxybenzaldehyde, allyloxy-tert-butyldimethylsilane, (allyloxycarbonylmethyl) triphenylphosphonium iodide, 4allyloxy-2-hydroxybenzophenone, 3-allylooxy-2-hydroxy-1-propanesulfonic acid, doium salt, 3-allyloxy-1,2-propanediol, allylpalladium chloride dimer, allylpentafluorobenzene, 2-allylphenol, allyl phenyl ether, allyl phenyl sulfone, allylphosphonic dichloride, allyl propyl ether, 3-allylrhodanine, allyl sulfide, allyl-1,1,2,2-tetrafluoroethyl ether, allyl tetraisopropylophosphorodiamidite, 2-(allylthio) benzimidazole, 4-ally-3-thiosemicarbazide, 1-allyl-2-thiourea, allyl-2,4,6-tribromophenyl ether, allyltributyltin, allyl trifluoroacetate, allytriphenylphosphonium bromide, allyltriphenylphosphonium chloride, allyl (triphenylphosphoranylidene)acetate, allyltriphenyltin, and allylurea.

Additional vinyl resins that may be useful include vinyl acetate, vinylacetic acid, vinyl acrylate, 4-vinylaniline, 4vinylanisole, 9-vinylanthracene, vinyl benzoate, 4-vinylbenzoic acid, vinylbenzyl chloride, 4-vinylbenzyl chloride, 4-vinylbiphenyl, vinyl bromide, vinyl 4-tert-butylbenzoate, 9-vinylcarbazole, vinyl chloride, vinyl chloroformate, vinyl crotonate, vonylcyclohexane, 4-vinyl-1-cyclohexene, 4-vinyl-1-cyclohexene, 4-vinyl-1-cyclohexene 1,2-epoxide, vinylcyclopentane, vinyl decanoate, 2-vinyl-1,3-doxolane, vinylene carbonate, vinylene trithiocarbonate, vinyl 2-ethylhexanoate, vinylferrocene, N-vinylformamide, 4,4-vinylidene bis(N,N-dimethylaniline), vinylidene chloride, vinyldene fluoride, 1-vinylimidazole, vinylmagnesium bromide, vinyl methacrylate, 2-vinylnaphthalene, vinyl neodecanoate, 5-vonyl-2-norbornene, 4-vonylphenylboronic acide, vinylphosphonic acid, N-vinylphthalimide, vinyl pivalate, vinyl propionate, 2-vinylpyridine, 4-vinylpyridine, 1-vinyl-2-pyrrolidone, vinyl stearate, vinyl sulfone, vinylsulfonic acid, sodium salt, vinyltrifluoroacetate, and vinyltriphenylphosphonium bromide.

The amount of the curable unsaturated organic component is from about 50 to about 95% by weight, of total composition. Desirably, the amount is from about 80 to about 90% by weight, of the total composition.

Particularly useful organic components include glycidyl ether type epoxy resins such as bisphenol A type epoxy resins, bisphenol F type epoxy resins, phenol novolak type epoxy resins, orthocresol novolak type epoxy resins, brominated epoxy resins and biphenyl type epoxy resins, cyclic aliphatic epoxy resins, glycidyl ester type epoxy resins, glycidylamine type epoxy resins cresol novolak type epoxy resins, naphthalene type epoxy resins, phenol aralkyl type epoxy resins, cyclopentadiene type epoxy resins, heterocyclic epoxy resins and combinations thereof Diallyl ether Bisphenol A is a particularly desirable organic component for use herein.

When monofunctional (meth)acrylate esters are employed in the sealant composition, an ester which has a relatively polar alcohol moiety may be used. Such materials are less volatile than low molecular weight alkyl esters and, in addition, the polar group tends to provide intermolecular attraction in the cured polymer, thus producing a more durable seal. The polar group may be selected from the group consisting of labile hydrogen, heterocyclic ring, hydroxy, amino, cyano, and halogen polar groups. Typical examples of compounds within this category are cyclohexylmethacrylate, tetrahydrofurfuryl methacrylate, hydroxethyl acrylate, hydroxypropyl methacrylate, t-butylaminoethyl methacrylate, cyanoethylacrylate, and chloroethylmethacrylate.

The polymerizable poly(moth)acrylate esters are exemplified by, but not restricted to, the following materials; di-, tri- and tetraethylenegylcol dimethylacrylate, dipropyleneglycol dimethacrylate; polyethyleneglycol dimethylacrylate; di(pentamethyleneglycol) dimethylacrylate; tetraethyleneglycol diacrylate; tetraethylenegylcol di(chloroacrylate); diglycerol diacrylate; diglycerol tetramethacrylate; tetramethylene dimetacrylate; ethylene dimethacrylate; and neopentylglycol diacrylate.

The present invention uses at least one co-reactant having at least two reactive functional groups, such as a silicon hydride with at least two SiH groups in the molecule such that they react with the carbon-carbon multiple bonds of the unsaturated organic component while in the presence of the catalyst. The co-reactant should be present in amounts sufficient to achieve the desired amount of crosslinking and desirably in amounts of about 5 to about 50% by weight of the total composition. Desirably, the amount of co-reactant is about 15% by weight of the total composition. A particularly useful co-reactant is polymethylhydrogen siloxane.

SiH functional co-reactants typically contain 2 or 3 hydrolyzable groups connected to the silicone atom thereof Desirably, there are three SiH groups to encourage more cross-linking. The ratio of carbon double bonds in the organic component to SiH groups in the co-reaction is in the range of 1:2 to 1:3 and preferable 1:3 to insure more cross-linking with the unsaturated organic component.

The silicone hydride co-reactant typically has the formula $R_aSi(X)_{4-n}$ wherein the R groups are the same or different and selected from the group consisting of hydrogen, $C_1$–$C_{12}$ alkyl, $C_6$–$C_{12}$ aryl, $C_7$–$C_8$ arylalkyl, $C_7$–$C_{18}$ alkylaryl, haloalky, haloaryl and monovalent ethylenically unsaturated radicals, X is a hydrolyzable functionality selected from the group consisting of alkoxy, oximino, enoloxy, amino and amido and n is an integer of from 0 to 1, with the proviso that when x is alkoxy, the reaction is in the presence of an organo lithium, titanium or tin catalyst, said silicone composition having at least one silane per SiH functionality.

The silicon hydride co-reactant includes agents conforming to the formula below:

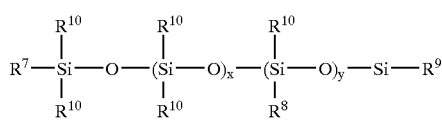
(I)

wherein at least two of $R^7$, $R^8$ and $R^9$ are H; otherwise $R^7$, $R^8$ $R^9$ can be the same or different and can be a substituted or unsubstituted hydrocarbon radical from $C_{1-20}$ such hydrocarbon radicals including those as previously defined for formula I above; thus the SiH group may be terminal, pendent or both; $R^{10}$ can also be a substituted or unsubstituted hydrocarbon radical from $C_{1-20}$ such hydrocarbon radicals including those as previously defined for formula I above, and desirably is an allyl group such as methyl; x is an integer from 10 to 1,000; and y is an integer from 1 to 20. Desirably R groups which are not H are methyl.

Silane compounds serve as useful monomers or capping agents for monomers whose length, size, extent of branching in distribution of functional groups may be designed to provide specific desirable properties in the resulting curable polymer thereof. Examples of suitable hydrolyzable groups include chloro, methoxy, ethoxy, oxine such as methyl, ethyl, ketoxinino, acetoxy, N-diackylamino and the like. For most organosiloxane polymerization or capping reactions, methoxy or chloro groups are useful. Silane compounds useful as the co-reactant include methylhydrogen polysiloxanes, methylhydrogen dimethylsiloxane co-polymers, alkyl methyl polysiloxanes, bis (dimethylsilyl) alkanes and bis(dimethylsilyl)benzene. Specifically, the following silanes have been found to be useful: methyl trimethylmethoxysilane, vinyl trioxyiminosilane, phenyl trioxyiminosilane, methyl trienoxysilane, vinyl trienoxysilane, phenyl trienoxysilane, tetraethoxysilane and combinations thereof.

Whereas conventional impregnation sealant compositions use a free-radical mechanism, a heat-cure initiator or an initiator system having a redox polymerization initiator, the inventive compositions use hydrosilation chemistry to crosslink the curable unsaturated organic component and the co-reactant having two reactive functional groups. Hydrosilation is an addition cure reaction where a composition is thermally cured by means of a catalyzed cross-linking reaction between the multiple carbon bonds of the unsaturated organic component and the co-reactant. The use of this hydrosilation chemistry permits storage and shipping in a single container of one-part heat curable compositions.

Hydrosilation catalysts include any catalyst or precursor catalyst that is capable of initiating the cure of the composition. Such catalysts include those based on transition metals of Group VIII-metals such as ruthenium, rhodium, palladium, osmium, iridium and platinum, and the like including complexes of these metals.

Any type of platinum catalyst compatible with the present invention may be used. Their selection depends upon such factors as speed of the reaction required as well as expense, useful shelf-fife, useful pot-life and the temperature at which the cure reaction is to take place.

Platinum containing catalysts are useful in this invention and include chloroplatinic acid, chloroplatinic acid hexahydrate, complexes of chloroplatinic acid with cis-divinyltetramethyldisiloxane, dichloro-bis (triphenylphosphine) platinum (II), cis-dichloro-bis (acetonitrile) platinum (II), dicarbonyldichloroplatinum (II), platinum chloride and platinum oxide. Zero valent platinum metal complexes, such as Karstedt's catalysts in chloroplatinic acid, may also be used. The reactions can be carried out alone or in solvents, which do not interfere with hydrosilations. Toluene, hexene, tetrahydrofuran, methylene chloride and benzene are examples of suitable organic solvents. The catalyst may be solid platinum, deposited on a carrier such as charcoal or gamma alumina.

The hydrosilation catalysts may be used in any amount effective for thermal curing to occur. The catalyst may be utilized at levels at about 10 ppm to about 30 ppm and more preferably about 20 ppm.

Other classes of catalysts include, in addition to organoplatinum and organoplatinum complexes, organorhodium and platinum alcoholates. Complexes of ruthenium, palladium, osmium and iridium are also contemplated. The amount of this catalyst is not critical so long as proper crosslinking is achieved. Combinations of various precious metal or precious metal-containing catalysts are contemplated.

A solubilized platinum catalyst complex is also comtemplated. Useful catalyst and curing agent solutions include methyl hydrogen polysiloxane solution with a 25% platinum-catalyst solution, cyclo tri(vinyl methylsiloxane) with a $Pt(CO)_2Cl_2$ solution and combinations thereof in amounts of 0.02–20% and desirably 0.02–5.0% by weight of the solution.

In order for the catalyst to function most efficiently in the dynamic curing environment, it is important that it is inherently thermally stable or that its activity is inhibited to prevent too rapid a reaction or catalyst decomposition. A particularly useful catalyst inhibitor is acetylenic alcohol. Appropriate catalyst inhibitors that are suitable to stabilize the platinum catalyst include 1,3,5,7 tetravinyl-1,3,7 tetramethylcyclotetrasilozane and its higher analogs such as vinyl cyclic pentamer. However, other olefins that are stable above 165° C. may also be useful. These include maleates, fumarates and cyclic pentamers. It is also particularly described to use a catalyst that remains soluble in the reaction medium.

The inventive compositions are suitably non-aqueous, i.e., substantially water-free, in character. The sealant composition's viscosity is desirably from about 1 to about 1,000 centipoise and desirably is between about 5 and 500 centipoise. The most highly desirable range is from about 5 to about 150 centipoise. Viscosities higher than those indicated may make penetration of the sealant into the porous part difficult or impossible and reduce the ease of dissolution; extremely low viscosity sealants tend to "leak" from the part subsequent to penetration. In certain sealing situations where relatively large gaps are to be closed and relative slowness of dissolution can be tolerated, much higher viscosity sealants (e.g., 10,000–100,000 centipoises) may be desirable. Surface tension of the sealant also can effect these characteristics, but control of viscosity seems to be the more important factor. The ideal viscosity for any sealant will be a function of the solubility of the sealant, the particular surfactant to be used, and the pore size of the porous part to be impregnated, and can be determined easily with a minimum of routine tests. Viscosity values are measured by the Cannon-Fenske method.

The inventive compositions are useful in most impregnation applications such as to seal an article with a pourous surface. The composition is particularly useful in sealing porous metals, such as those used in electrical components and electrical connectors. Other applications include sealing the porous surfaces of articles used in the automobile industry, such as intake manifolds, engine blocks, power steering pumps, air conditioning housings and the like. The inventive compositions may also be useful in sealing non-metal articles such as porous wood products.

The composition may contain conventional additives, which can be introduced into the composition during or after the hydrosilation process. Additives which may interfere with hydrosilation should be added after cross-linking reaches the desired level. Examples of such additives are antioxidants, viscosity modifiers, pigments, waxes, antistatic agents, ultraviolet stabilizers, plasticizers, foaming agents, flame retardants and other appropriate processing aids. Such additives may include from about 0.1 to about 30 percent by weight based on the weight of the sealant composition product. Useful additives include calcium carbonate, silica, talc, titanium dioxide, carbon black and the like.

Typical collating agents useful for the purpose to include materials such as 1,2-bis(3,5 di-tert-butyl-4-hyroxyhydrocinnamoyl) hydrazine and the like. These agents may be incorporated in the composition prior to or after the hydrosilation. Useful amounts of chelating agent range from about 0.1% to about 5.0% by weight of the total composition.

In preparation of the compositions of the present invention, the curable unsaturated organic component is blended or mixed with the co-reactant and the catalyst Subsequently, the sealant composition is impregnated into the pores of the part to be sealed and then heated in order to effect the cross-linking of the curable unsaturated organic component.

The following examples serve to illustrate the invention, without in any way restricting its spirit and scope. All percentages throughout the specification and claims are by weight of the total composition unless otherwise indicated.

EXAMPLES

Inventive composition 1 was prepared by blending diallyl ether bisphenol A (85% by weight of the total composition) with polymethylhydrogen siloxane (15% by weight of the total composition). A small amount of platinum catalyst was added to the composition and stirred for 5 minutes. To cure the composition, it was placed in an oven at a temperature of about 56° C. for a period of time of about 3 minutes and then in an oven at a temperature of about 100° C. for a period of time of about 10 minutes. The compositions were determined to be fully polymerized. To test the impregnation characteristics of Composition 1, stainless steel disks with a density of 6.5 to 6.8 were used. Two disks were impregnated with Composition 1 at a vacuum of 29.8 in. Hg. One disk was submerged in Composition 1 for 10 minutes and the second disk was submerged in Composition 1 for 15 minutes. Subsequently, these disks were heat cured in a 90–95° C. water bath. A third "control" disk was not impregnated with the sealant composition.

The disks were weighed three times: prior to impregnation, after impregnation and after heat curing. As shown in Table 1, since disk 1 and 2 each retained the weight of the sealant, it is clear that the inventive composition works extremely well as a porosity sealant.

TABLE 1

POROSITY SEAL TESTING WITH INVENTIVE COMPOSITION 1

| Sample* | Weight Gain | Leak Rate/minute |
|---|---|---|
| Disk 1 | 0.20 grams | 0 |
| Disk 2 | 0.31 grams | 0 |
| Disk 3 (control) | 0 grams | >4 liters |

*Samples impregnated are stainless steel #316 disks with a density of 6.5–6.8.

To test the stability of the inventive compositions, the inventive composition is placed in a 1 liter polyethylene container and kept at 120° F. for 7 days. Compositions that showed little or no degradation or polymerization were determined to have good stability.

The invention being thus described, it will be clear to those skilled in the art that the same may be varied in many ways. Such variations are not to be regarded as a departure from the spirit and scope of the invention and all modifications are intended to be included within the scope of the claims.

What is claimed is:

1. A heat curable composition comprising:
   (i) at least one curable unsaturated organic component, wherein said curable unsaturated organic component is cured by hydrosilation;
   (ii) at least one co-reactant having at least two functional groups reactive with the organic component; and
   (iii) at least one catalyst capable of initiating cure of the composition, wherein said co-reactant is selected from the group consisting of methyl trimethylmethoxysilane, vinyl trioxyiminosilane, phenyl trioxyiminosilane, methyl trienoxysilane, vinyl trienoxysilane, phenyl trienoxosilane, tetra ethoxysilane and combinations thereof.

2. The composition according to claim 1, wherein said curable unsaturated organic component is a non-silicon based cross-linkable monomer.

3. The composition according to claim 1, wherein said curable unsaturated organic component is an allyl resin.

4. The composition according to claim 1, wherein said curable unsaturated organic component is a vinyl resin selected from the group consisting of vinyl stearate, vinyl (meth)acrylate and combinations thereof.

5. The composition according to claim 1, wherein said curable unsaturated organic component comprises diallyl ether bisphenol A.

6. The composition according to claim 1, wherein said curable unsaturated organic component is in an amount from about 50% to about 95% by weight.

7. The composition according to claim 1, wherein said catalyst is a metallo hydrosilation catalyst.

8. The composition according to claim 1, wherein said catalyst is based on a metal selected from the group consisting of ruthenium, palladium, rhodium, osmium, iridium, platinum and combinations thereof.

9. The composition according to claim 1, wherein said catalyst is present in amounts from about 1 ppm to about 30 ppm.

10. An article of manufacture comprising:
    an openable container for packaging a flowable heat curable composition according to claim 1 in which said heat curable composition is stored.

11. A method of manufacturing a heat curable composition according to claim 1, the steps of which comprise:
   a) providing at least one curable unsaturated organic component wherein said curable unsaturated organic component is cured by hydrosilylation; and
   b) combining said curable unsaturated organic component with at least one co-reactant having at least two functional groups reactive with the organic component and at least one catalyst capable of initiating cure of the composition,
   wherein said co-reactant is selected from the group consisting of methyl trimethylmethoxysilane, vinyl trioxyiminosilane, phenyl trioxyiminosilane, methyl trienoxysilane, vinyl trienoxysilane, phenyl trienoxosilane, tetra ethoxysilane and combinations thereof.

12. An article of manufacture impregnated with a heat curable composition according to claim 1, said article comprising a porous surface.

13. An article according to claim 12, wherein said article is selected from the group consisting of metal substrate, plastic substrate, wood substrate and combinations thereof.

14. An article according to claim 12, wherein said article is an electrical component.

15. A heat curable composition comprising:
   (i) at least one curable unsaturated organic component, wherein said curable unsaturated organic component is cured by hydrosilation;
   (ii) at least one co-reactant having at least two functional groups reactive with the organic component; and
   (iii) at least one catalyst capable of initiating cure of the composition, wherein said curable unsaturated organic component comprises diallyl ether bisphenol A wherein said co-reactant is selected from the group consisting of methyl trimethylmethoxysilane, vinyl trioxyiminosilane, phenyl trioxyiminosilane, methyl trienoxysilane, vinyl trienoxysilane, phenyl trienoxosilane, tetra ethoxysilane and combinations thereof.

16. The composition according to claim 15, wherein said curable unsaturated organic component is in an amount from about 50% to about 95% by weight.

17. The composition according to claim 15, wherein said catalyst is a metallo hydrosilation catalyst.

18. An article of manufacture comprising:
   an openable container for packaging a flowable heat curable composition according to claim 15 which said heat curable composition is stored.

19. A method of manufacturing a heat curable composition according to claim 15, the steps of which comprise:
   a) providing at least one curable unsaturated organic component, wherein said curable unsaturated organic component comprises diallyl ether bisphenol A; and
   b) combining said curable unsaturated organic component with at least one co-reactant having at least two functional groups reactive with the organic component and at least one catalyst capable of initiating cure of the composition wherein said co-reactant is selected from the group consisting of methyl trimethylmethoxysilane, vinyl trioxyiminosilane, phenyl trioxyiminosilane, methyl trienoxysilane, vinyl trienoxysilane, phenyl trienoxosilane, tetra ethoxysilane and combinations thereof.

20. An article of manufacture impregnated with a heat curable composition according to claim 15, said article comprising a porous surface.

* * * * *

UNITED STATES PATENT AND TRADEMARK OFFICE
CERTIFICATE OF CORRECTION

PATENT NO. : 6,872,454 B2  
DATED : March 29, 2005  
INVENTOR(S) : Newberth, III et al.

It is certified that error appears in the above-identified patent and that said Letters Patent is hereby corrected as shown below:

Column 1,  
Line 47, the printed patent should read -- ...conditions of extreme heat. --.

Column 8,  
Line 62, the printed patent should read -- ...from about 10 ppm to about 30 ppm. --.

Signed and Sealed this

Nineteenth Day of July, 2005

JON W. DUDAS  
*Director of the United States Patent and Trademark Office*